(No Model.) 2 Sheets—Sheet 1.
M. AMADOR.
CULTIVATING MACHINE.
No. 467,221. Patented Jan. 19, 1892.
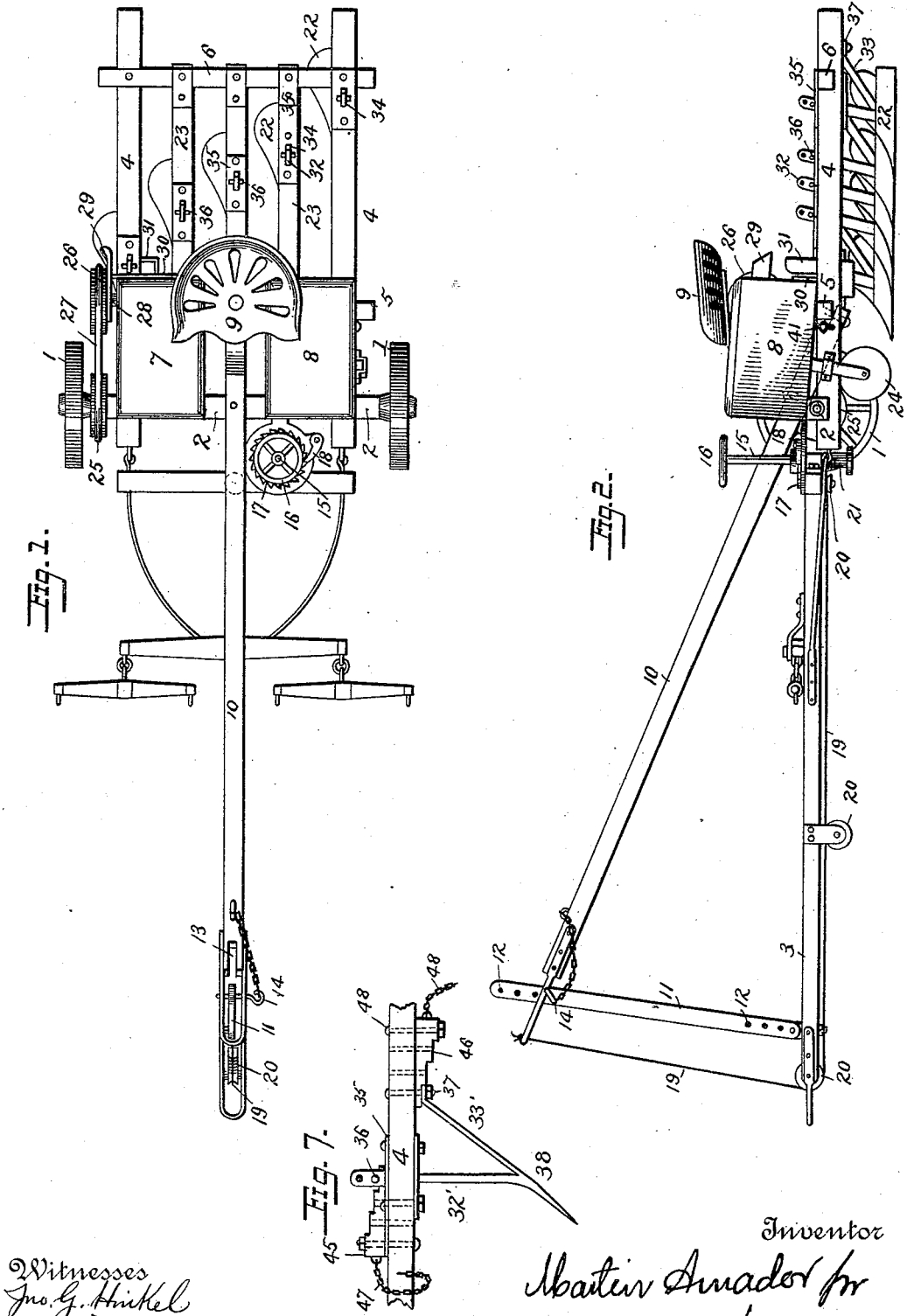
Witnesses
Jno. G. Hinkel
J. S. Barker.
Inventor
Martin Amador
Charles William B. King Attorneys

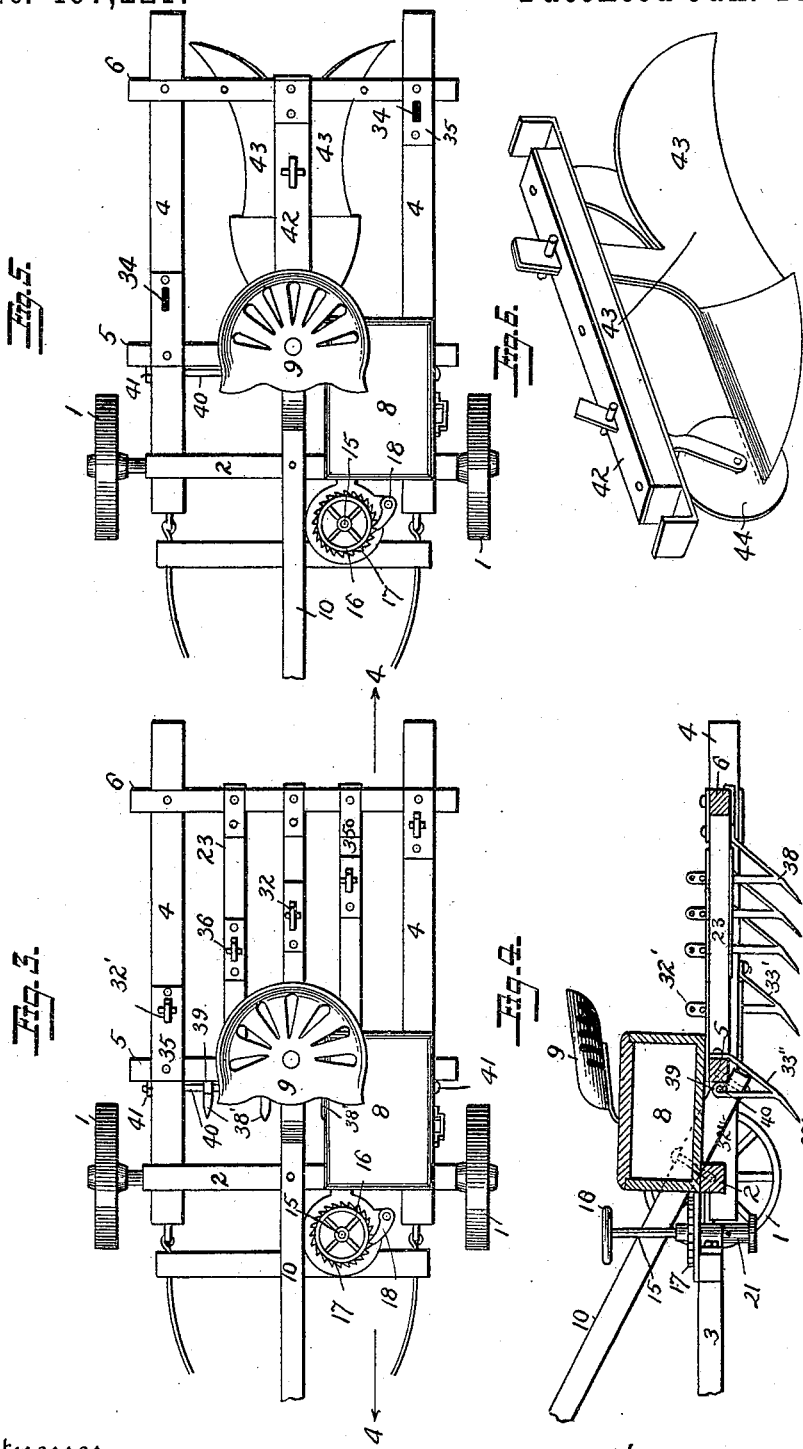

UNITED STATES PATENT OFFICE.

MARTIN AMADOR, OF LAS CRUCES, TERRITORY OF NEW MEXICO.

CULTIVATING-MACHINE.

SPECIFICATION forming part of Letters Patent No. 467,221, dated January 19, 1892.

Application filed August 18, 1891. Serial No. 403,038. (No model.)

*To all whom it may concern:*

Be it known that I, MARTIN AMADOR, a citizen of the United States, residing at Las Cruces, in the county of Doña Aña and Territory of New Mexico, have invented certain new and useful Improvements in Cultivating-Machines; and I do hereby declare the following to be a full, clear, and exact description of the invention, such as will enable others skilled in the art to which it appertains to make and use the same.

My invention has for its object to produce a machine by which various kinds of agricultural work in the nature of cultivating the soil may be performed; and it consists of a wheeled machine having in rear of the wheels a frame adapted to carry or support various cultivating implements, the invention particularly consisting in improvements in the construction of these parts of the machine, in the means whereby the said rear frame may be adjusted, and in improvements in the details of the machine, all of which will be hereinafter fully pointed out and described.

In the drawings, Figure 1 is a plan view of the machine embodying my invention and arranged to constitute a cultivating and seeding machine. Fig. 2 is a side elevation of the machine shown in Fig. 1, one of the supporting-wheels being removed. Fig. 3 is a plan view showing the machine arranged as a cultivator. Fig. 4 is a section on the line 4 4 of Fig. 3. Fig. 5 is a plan view of the machine arranged as a ditch-plow. Fig. 6 is a perspective view of the ditch-plow and its carrying-beam shown in Fig. 5.

In the drawings, 1 1 designate a pair of supporting-wheels mounted upon an axle 2, to which the draft-tongue 3 is pivotally connected in any suitable manner. A rectangular frame is secured at its front end at the axle 2, such frame consisting of the longitudinal side bars 4 4 and the front and rear cross-pieces 5 and 6. By this rectangular frame are carried the cultivating implements, which may be either plows, cultivators, or harrow-teeth, as the use to which the machine is put requires, and upon it are supported the seed-box 7 and tool-box 8, when they are used, and the driver's seat 9.

When the machine is being transported from place to place, it is desirable to elevate the rear frame, so that the cultivating implements carried thereby should not drag upon the ground, and it is also desirable to be able to vary the depth to which the implements shall be made to work in the soil, and this is done by vertically adjusting this frame. I have devised novel means for effecting such adjustment, which I will now describe.

10 is an arm connected at its rear end with the said rectangular frame and extended forward in the same vertical plane as the pole or tongue 3, over which it is situated. When the frame is horizontal, the arm 10 inclines upward toward its front end, this being insured by connecting the rear end of the arm to the under side of the front cross-bar 5 and passing it over the top or upper face of the axle 2, to which it is also preferably connected. At or near the front end of the tongue is pivoted an arm 11, which is perforated at various places, as at 12, and to this arm the forward end of the arm 10 is adapted to be connected. It will be understood that as the forward end of the arm 10 is depressed the rear rectangular frame is elevated, and that as it is elevated the frame is correspondingly lowered, and that the frame can be held in any position (between its extremes of movement) to which it is adjusted by connecting together the arms 10 and 11 at the proper places. The forward end of the arm is slotted, as at 13, and in the slot lies the arm 11, and a pin 14 is connected with one or the other of the arms, preferably the one 10, by a chain or otherwise, which pin, if placed through one of the holes 12 in the arm 11 above the arm 10, holds the latter in place immediately below it, and hence holds the rear frame in the position to which it has been adjusted. Any other suitable means of connecting the arms 10 and 11 might be used.

The arm 10 might be moved and the rear frame adjusted by hand, the operator grasping the forward end of the arm; but this method of adjustment would be difficult and inconvenient, and I have therefore devised means whereby the driver, while sitting upon the seat 9, can easily effect the adjustment of the frame. It will be understood that the weight of the rear frame tends ordinarily to elevate the arm 10.

15 is a shaft provided with a small winding-drum 21, a hand-wheel 16, and a ratchet-wheel 17, with which latter there engages a dog 18. This shaft is mounted on the tongue-frame, with the wheel 17 and dog 18 within convenient reach of the driver when on the seat.

19 is a rope or chain connected with the front end of the arm 10 and passing over pulleys 20 along the tongue 3, preferably along its under side, to the drum 21. It will be understood that by winding the rope upon the drum or on shaft 15 the arm 10 will be depressed and the rear frame correspondingly elevated, and that the frame may be held in the desired position by causing the dog 18 to engage with the ratchet-wheel 17. When the parts are held in their adjusted positions by these devices, the arms 10 and 11 need not be connected, in which event the arm 11 is principally useful as a means for steadying and guiding the outer end of the arm 10. Even with these adjusting means, however, the pin 14 will ordinarily be used to hold down the arm 10 whenever the rear frame is to be held in a certain elevated position for a considerable length of time, as thereby the rope or chain 19 is relieved of strain.

I will now describe the machine when arranged as a seeding and cultivating machine. A gang of five plows 22 is shown arranged diagonally across the rear frame, the outer plows being carried by the side bars 4, and the intermediate ones by plow-beams 23, arranged between the cross-bars 5 and 6 and parallel to the side bars 4. The beams 23 are detachably connected at their ends in any suitable manner with the bars 5 and 6, so that a greater or less number of them may be employed.

I prefer to employ colters 24 24 in front of the outer plows, such colters being carried by the bars 4 near their forward ends.

25 is a band-pulley, carried by one of the wheels 1, and 26 is another band-pulley connected to the pulley 26 by a band 27. The pulley 26 is mounted on a shaft 28, supported by the seed-box 7, and it carries a tappet or finger 29, which, as the pulley 26 is made to revolve, engages with a spring-plate 30, secured to the rear face of the box and connected with the seed-slide which controls the discharge-opening from the seed-box.

31 is the seed-spout leading from the discharge-opening down nearly to the surface of the ground just inside of the outer forward plow.

With a machine arranged as shown in Figs. 1 and 2 the gang of plows is as wide as the distance between two rows of seed which are planted, and the plows break up and overturn the soil between the rows, the preparing of the soil and the seeding being effected at one and the same time.

The plows 22 are detachably secured to their supporting bars or beams, so that they may be easily removed and other implements put in their place.

32 represents the plow-standard, which is a flat bar of metal arranged in the plane of the beam to which it is secured, and 33 is another bar, which serves to brace the plow, its upper end 37 being twisted or bent, so that it lies in a plane at right angles to that in which the standard 32 lies and parallel with the under face of the beam to which it is secured. The plow-beam is slotted at 34 for the passage of the flat plow-standard, which fits rather closely in the slot, the hole being preferably surrounded by a metal plate 35. To secure the plow to the beam or bar 4, the standard 32 is passed through the slot 34 and secured by a pin 36, wedges, or otherwise, in the proper position, and the end 37 of the brace-bar 33 is bolted or otherwise secured to the under side of the beam. This construction makes it very easy to remove or attach a plow, which when secured in place is very rigidly held.

In Fig. 3 is shown the machine when arranged as a cultivator particularly adapted for the cultivating of alfalfa. The seeding devices have been removed, and in place of the plows 22 cultivating implements 38 have been secured to the beams, the cultivators being arranged with standards 32' and brace bars or rods 33' like the similar parts of the plows 22, so that they can be attached at the same places and in the same manner as the plows. The cultivators should be arranged closer together transversely than the plows, and hence, besides the series of cultivators 38, which are arranged diagonally across the rear frame, I provide another series 38', arranged transversely across the machine, each cultivator 38' being arranged on a line between two of the cultivators 38. The upper ends of the standards 32'' of the cultivators 38' are formed into loops or eyes 39, through which is passed a bar or rod 40, extending between the side frame-bars 4 and in front of the cross-piece 5. The brace-bars 33'' of the cultivators 38' are secured to the cross-bar 5. The rod 40 may have means—such as the screw rods and nuts 41—by which they may be vertically adjusted to cause the cultivators to enter more or less deeply into the soil.

If desired, the beams 23 may be removed and plows of any suitable size and kind be carried by the outer side bars 4 4. This arrangement will be used when it is desired to open drills or trenches.

In Fig. 5 I have shown the machine arranged for ditching purposes. In this arrangement the beams 23 and the plows are removed and replaced by a beam 42, arranged, preferably, midway between the side bars 4 and supported at its ends by the cross-bars 5 and 6. This beam carries a large ditching-plow, the mold-boards 43 of which are arranged to throw the soil on opposite sides of the furrow or ditch. The point of this plow is divided, and in the slot which separates the two parts is mounted a revolving colter 44, which splits the soil and causes it to be thrown evenly on the two sides of the ditch.

From this description and the illustration of my invention it will be seen that the machine in which the invention is embodied is capable of a variety of uses, and that the various parts are constructed with special reference to the uses to which the machine is to be put, and that the parts which are interchangeable may be easily and quickly taken off or put on the permanent parts of the machine by any one possessed of the simplest tools.

It will be understood that various parts of the machine might be modified or changed in shape, size, or arrangement without departing from my invention.

What I claim is—

1. In combination with the wheels, the axle, and the tongue, the rear frame, the inclined arm 10, projecting forward therefrom over the tongue and supported upon the axle, the pivoted arm 11, carried by the tongue, and means for uniting the arms 10 and 11, substantially as set forth.

2. In combination with the wheels, the axle, and the tongue, the rear frame, the forward-projecting inclined arm 10, extending above the tongue, a rope or chain attached to the end of the arm 10 and passing around a pulley carried by the tongue, and a winding device for the rope or chain situated upon the machine, substantially as set forth.

3. The combination, with the wheels, the axle, and the tongue, of the rear frame, the inclined arm 10, extending forward from the frame and supported upon the axle, the pivoted arm 11, carried by the tongue and extending through a slot in the arm 10, means for uniting the arms 10 and 11, a rope or chain attached to the arm 10 at or near its end and passing under a pulley carried by the tongue, and a winding device for the rope or chain, substantially as set forth.

In testimony whereof I affix my signature in presence of two witnesses.

MARTIN AMADOR.

Witnesses:
   ISIDORO ARMIJO, Jr.,
   A. BARELO.